(12) United States Patent
Uchida et al.

(10) Patent No.: US 6,653,754 B2
(45) Date of Patent: Nov. 25, 2003

(54) MOTOR FOR WIPER DEVICE HAVING NOISE SUPPRESSING COILS AND BURN-OUT PROTECTOR

(75) Inventors: Yasuaki Uchida, Kosai (JP); Toshio Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 75 days.

(21) Appl. No.: 09/799,737

(22) Filed: Mar. 7, 2001

(65) Prior Publication Data
US 2001/0022475 A1 Sep. 20, 2001

(30) Foreign Application Priority Data
Mar. 16, 2000 (JP) ........................................ 2000-074462

(51) Int. Cl.[7] ................................................. H02K 5/24
(52) U.S. Cl. ........................ 310/51; 310/68 C; 310/71; 310/596; 310/239
(58) Field of Search .................... 310/51, 71, 68 R, 310/239, 68 C; 29/596, 598

(56) References Cited

U.S. PATENT DOCUMENTS

| | | | | | |
|---|---|---|---|---|---|
| 5,041,751 A | * | 8/1991 | Yokozuka | ................... | 310/239 |
| 5,066,878 A | * | 11/1991 | Sekine et al. | ............. | 310/68 C |
| 5,089,735 A | * | 2/1992 | Sawaguchi et al. | ........... | 310/88 |
| 5,194,769 A | | 3/1993 | Ade et al. | ..................... | 310/51 |
| 5,306,974 A | * | 4/1994 | Bates | ....................... | 310/68 R |
| 5,414,318 A | * | 5/1995 | Shimizu et al. | ........... | 310/68 C |
| 5,659,211 A | * | 8/1997 | Blanchet | ...................... | 310/42 |
| 5,734,219 A | * | 3/1998 | Horski et al. | ................ | 310/240 |
| 5,872,411 A | * | 2/1999 | Nakata | ....................... | 310/71 |
| 5,937,506 A | * | 8/1999 | Nakata | ....................... | 29/596 |
| 5,942,819 A | * | 8/1999 | Burgess et al. | ................ | 310/51 |
| 5,977,683 A | * | 11/1999 | Scheele et al. | .............. | 310/242 |
| 6,163,096 A | * | 12/2000 | Michenfelder et al. | ...... | 310/239 |

* cited by examiner

*Primary Examiner*—Nestor Ramirez
*Assistant Examiner*—Leda Pham
(74) *Attorney, Agent, or Firm*—Posz & Bethards, PLC

(57) ABSTRACT

A wiper motor has brushes slidable in contact with a commutator, choke coils connected in series with the brushes, and a circuit breaker for preventing burn-out caused by excessively high current. The circuit breaker is disposed in the vicinity of the choke coils and operates based on heat generated by the choke coils.

17 Claims, 6 Drawing Sheets

MOTOR FOR WIPER DEVICE HAVING NOISE SUPPRESSING COILS AND BURN-OUT PROTECTOR

CROSS REFERENCE TO RELATED APPLICATION

This application is based on and incorporates herein by reference Japanese patent application No. 2000-74462 filed Mar. 16, 2000.

FIELD OF THE INVENTION

The present invention relates to a motor and a motor for a wiper device having a noise suppressing choke coil and a burn-out protector.

BACKGROUND OF THE INVENTION

A motor for a wiper and the like having a noise suppressing choke coil and a circuit breaker (breaker) serving as a burn-out protector is known. The choke coil and the breaker are connected in series with each other between a power supply brush which slides in contact with a commutator and an external power supply. The breaker is disposed in the vicinity of the commutator and a winding together with the brush.

In the motor of this type having the noise suppressing device, upon application of a direct current (DC) voltage thereto from the external power supply, the armature generates a magnetic field and the armature (rotor) rotates. At this time, electrical noise is generated due to a sliding contact between the brush and the commutator. The electrical noise is attenuated by the inductance of the choke coil. Accordingly, the electrical noise is propagated decreasingly to the external DC power supply, and radiation of an electromagnetic noise due to the electrical noise is restricted.

In the motor, when the winding of the armature generates heat owing to an excessively high current caused by a high load applied to the output side during the rotation of the rotor, the breaker is placed in an unconnected state owing to the heat generated by the winding of the armature and the heat generated by the breaker itself. Consequently, the breaker responds to this heat and cuts off electric current supply to the motor. Therefore, it is possible to prevent burn-out based on the heat thus generated.

However, a large number of members such as a spring for urging the brush toward the commutator and electric wires are disposed in the vicinity of the brush. Thus, it is difficult to dispose the breaker in the vicinity of the brush, commutator and the winding, particularly when the motor is sized small.

It is proposed to solve this drawback that the breaker is disposed apart from the armature and operated by only heat generated thereby. However, it is necessary to increase the internal resistance value of the breaker to operate it by only the heat generated thereby. Consequently, an internal resistance-caused voltage drop increases, and the efficiency of the motor decreases.

SUMMARY OF THE INVENTION

It is an object of the present invention to provide a motor and a motor for a wiper device which allows a burn-out protector to be easily disposed without decreasing the efficiency of the motor.

According to the present invention, a motor comprises brushes for a commutator, noise suppressing coil devices connected in series with the brushes, and a burn-out protector which prevents a motor burn-out caused by excessively high current. The burn-out protector is disposed in the vicinity of the coil devices to cut off electric current supplied to the brushes in response to heat generated by the coil devices.

Preferably, the burn-out protector is surrounded by the coil devices, and connected in series with a common brush which is used in common for a high-speed driving brush and a low-speed driving brush which are selectively used.

BRIEF DESCRIPTION OF THE DRAWINGS

The above and other objects, features and advantages of the invention will become more apparent from the following detailed description made with reference to the accompanying drawings. In the drawings.

DETAILED DESCRIPTION OF THE PREFERRED EMBODIMENT

Figure 1:
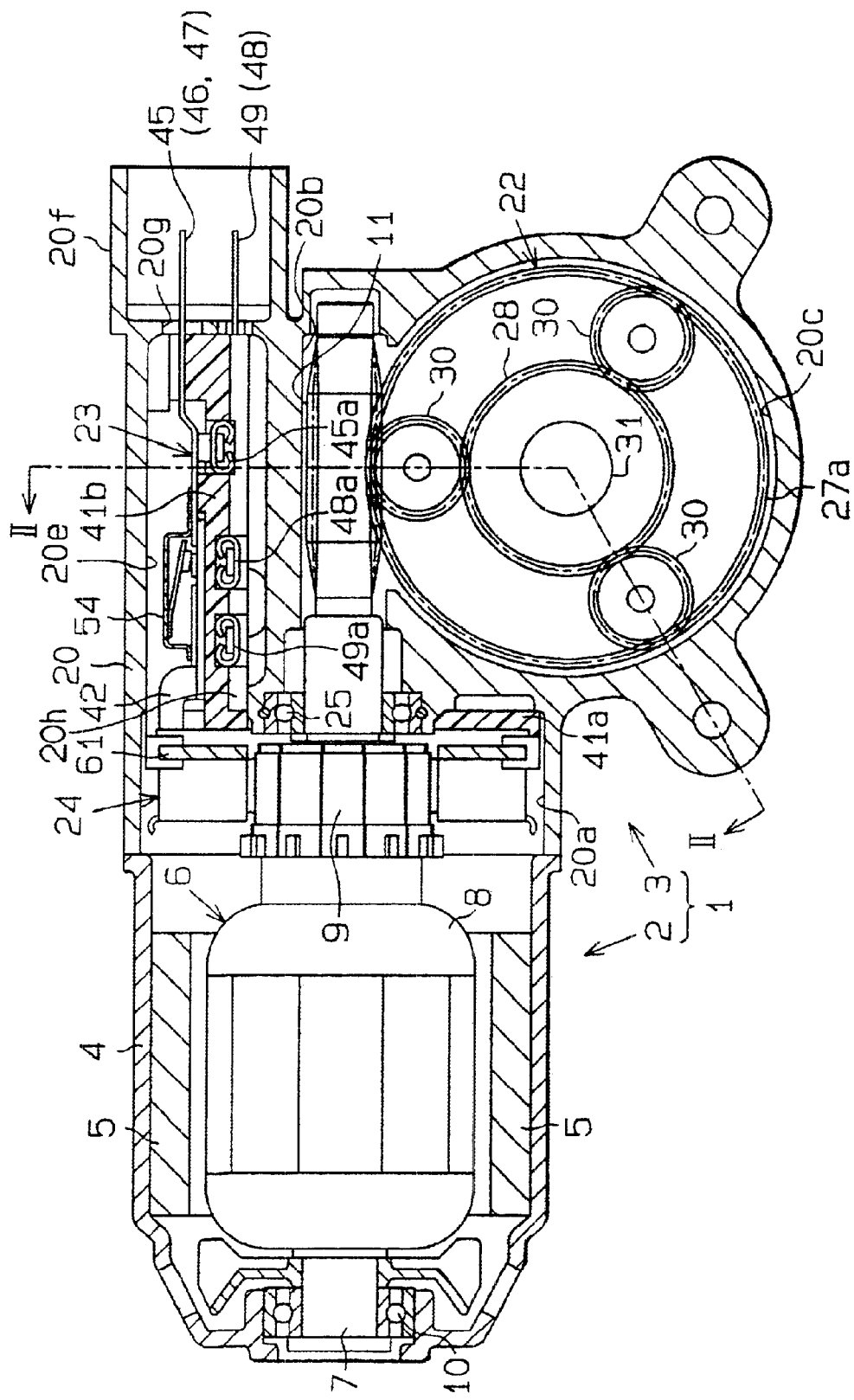
FIG. 1 is a sectional view showing a wiper motor according to an embodiment of the present invention.

Referring first to FIG. 1, a motor 1 for a wiper has a body 2 and a speed reduction unit 3. The body 2 has a cylindrical yoke housing (hereinafter referred to as merely yoke) 4 open at its one end and bottomed, a plurality of magnets 5 fixed to an inner peripheral surface of the yoke 4, and a rotor 6 accommodated in the yoke 4.

The rotor has a rotary shaft 7, an armature 8, and a commutator 9. A rear end of the rotary shaft 7 is rotatably supported by a bearing 10 disposed at the bottom (left end in FIG. 1) of the yoke 4. The armature 8 facing the magnets 5 is disposed at the rear side of the rotary shaft 7 by fixing the armature 8 to the rear side of the rotary shaft 7. The commutator 9 is fixed to the rotary shaft 7 at the side of the speed reduction unit 3, with the commutator 9 projecting from the open portion of the yoke 4. A worm 11 is formed at the front side of the rotary shaft 7.

The speed reduction unit 3 has a gear housing 20 made of an aluminum alloy, a cover 21 (FIG. 2), a speed reduction unit 22 serving as a speed reduction member, a circuit unit 23, and a brush holder unit 24. One end surface of the gear housing 20 fixedly connected to the yoke 4 is formed approximately rectangularly in the axial direction of the rotary shaft 7. A unit accommodation concave part 20a approximately rectangular in the axial direction of the rotary shaft 7 is formed at the one end surface of the gear housing 20. The gear housing 20 houses a worm accommodation part 20b extending from the center of the bottom of the unit accommodation concave part 20a and accommodating the front side (worm 11) of the rotary shaft 7. The gear housing 20 also houses a wheel accommodation part 20c communicating with the worm accommodation part 20b.

Figure 2:
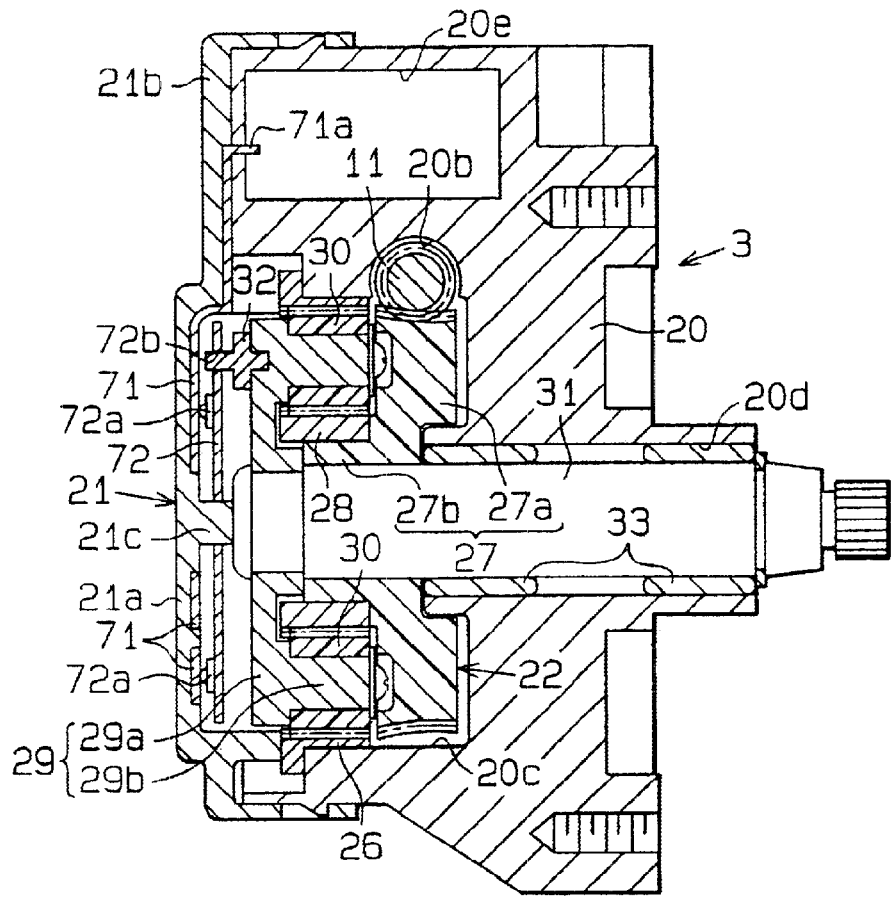
FIG. 2 is a sectional view taken along a line II—II in FIG. 1.

The wheel accommodation part 20c is disposed below the worm accommodation part 20b (lower side in FIG. 1) such that a direction perpendicular to the axial direction of the worm accommodation part 20b at the center thereof is coincident with the center point of the wheel accommodation part 20c. The wheel accommodation part 20c is substantially circular in the direction orthogonal to the axial direction of the rotary shaft 7. As shown in FIG. 2, one end (left in FIG. 2) of the wheel accommodation part 20c is open. The wheel accommodation part 20c has an axial hole 20d formed in the center of the other end thereof and extending to the outside.

The gear housing 20 has a unit accommodation part 20e parallel with the worm accommodation part 20b and extending from the bottom of the unit accommodation concave part 20a. This unit accommodation part 20e has an opening 20h which communicates with the brush accommodation concave part 20a. The gear housing 20 has a generally cylindrical connector body 20f formed integrally with the gear housing 20 at the front side (right side in FIG. 1) of the unit accommodation part 20e. The connector body 20f of approximately cylindrical shape is open at the side opposite to the side at which an open portion of the unit accommodation concave part 20a is formed. A communication hole 20g communicating with the unit accommodation part 20e is formed at the bottom of the connector body 20f.

A bearing 25 is disposed in an open portion of the worm accommodation part 20b to rotatably support an intermediate portion of the rotary shaft 7.

As shown in FIG. 2 (not shown in FIG. 1), an internal gear 26 is disposed on the inner peripheral surface of the wheel accommodation part 20c by spacing the internal gear 26 at a certain distance from the worm 11 in the axial direction (orthogonal to surface of the drawing sheet of FIG. 1, leftward in FIG. 2) of the wheel accommodation part 20c.

The wheel accommodation part 20c accommodates the speed reduction unit 22.

More specifically, as shown in FIG. 2, the speed reduction unit 22 has a wheel 27, a sun gear 28, a carrier 29, three planetary gears 30 (two planetary gears are shown in FIG. 2), and an output shaft 31. The wheel 27 has a ring-shaped worm wheel portion 27a having teeth on its peripheral surface and engaging the worm 11. The wheel 27 has a cylindrical portion 27b projecting in the axial direction (leftward in FIG. 2) of the wheel 27 from the inner periphery of the worm wheel portion 27a. The sun gear 28 is fitted on the peripheral surface of the cylindrical portion 27b such that the sun gear 28 is rotatable together with the cylindrical portion 27b. The carrier 29 has an annular disk part 29a and a plurality of supporting shafts 29b axially (to the right in FIG. 2) projecting at equal angles (120°) from one (front) surface of the disk part 29a. An engaging pin 32 is fixed to a position, of the other (rear) surface of the disk part 29a, corresponding to one of the supporting shafts 29b.

Planetary gears 30 are rotatably supported by the supporting shafts 29b respectively such that the planetary gears 30 engage the internal gear 26 and the sun gear 28. The intermediate portion of the output shaft 31 penetrates through the cylindrical portion 27b of the wheel 27 such that the intermediate portion thereof is rotatable relative to the inner peripheral surface of the cylindrical portion 27b. The rear end of the output shaft 31 is fitted on the inner peripheral surface of the disk part 29a of the carrier 29 such that the rear end of the output shaft 31 is rotatable together with the disk part 29a of the carrier 29.

That is, the speed reduction unit 22 is accommodated in the wheel accommodation part 20c such that the front side of the output shaft 31 is supported by a pair of plain bearings 33 fixed to the axial hole 20d, the teeth of the worm wheel portion 27a engages the worm 11, and the planetary gears 30 engage the internal gear 26. Therefore, the wheel 27 rotates with the rotation of the rotary shaft 7 (worm 11). According to the rotation of the wheel 27, the planetary gears 30 rotate, with the planetary gears 30 moving around the sun gear 28. With the revolution of the planetary gears 30 around the sun gear 28, the carrier 29 and the output shaft 31 rotate. That is, the speed reduction mechanism of the motor 1 for the wiper outputs the rotational speed of the rotary shaft 7 (rotor 6) reduced at two stages by means of the worm gear and the planetary gears.

The unit accommodation part 20e accommodates the circuit unit 23.

Figure 4:
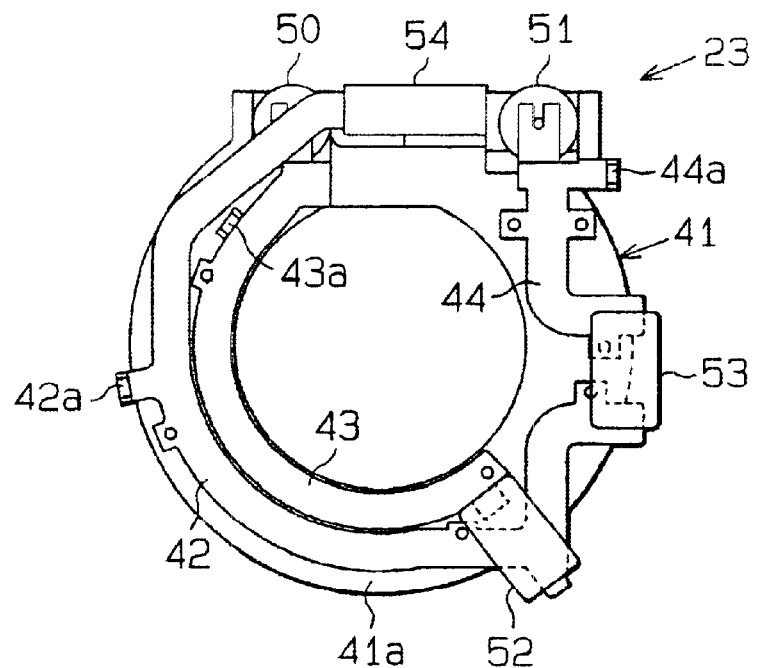
FIG. 4 is a left side view showing a circuit unit used in the embodiment.
Figure 5:
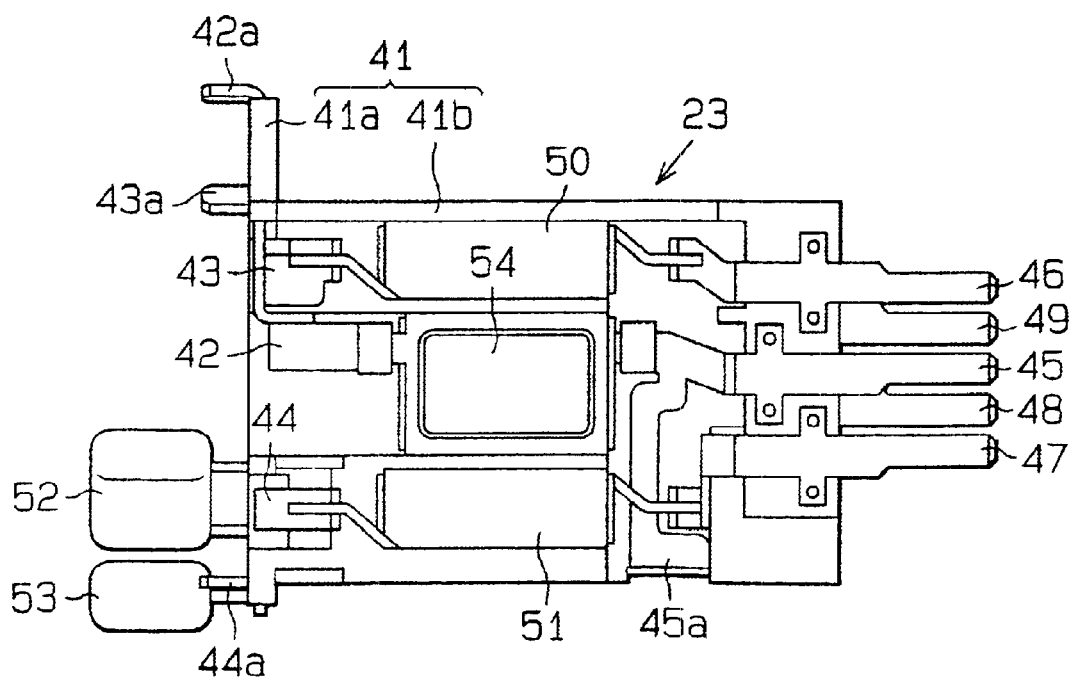
FIG. 5 is a plan view showing the circuit unit shown in FIG. 4.
Figure 6:
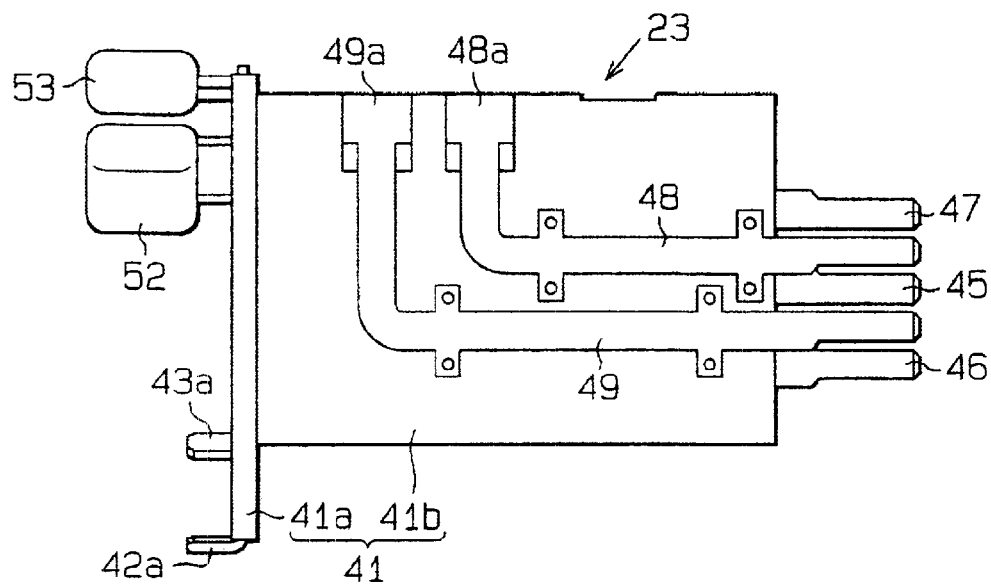
FIG. 6 is a bottom view showing the circuit unit shown in FIG. 5.

The circuit unit 23 is described in detail below. As shown in FIGS. 1, 4 through 6, the circuit unit 23 has a body 41, three brush-wiring terminals 42–44, five external terminals 45–49, two choke coils 50 and 51, two capacitors 52 and 53, and a circuit breaker (breaker) 54 serving as a burn-out protector. The unit accommodation part 20e is partitioned from the wheel accommodation part 20c and the worm accommodation part 20b thereby to restrict grease and the like pasted on the reduction members from entering into the unit accommodation part 20e and adhering to the circuit unit 23. FIG. 4 is a left side view showing the circuit unit 23. FIG. 5 is a plan view showing the circuit unit 23. FIG. 6 is a bottom view showing the circuit unit 23.

The body 41 of the circuit unit 23 is made of an insulating resin. The body 41 has an annular disk part 41a and an insertion plate part 41b, approximately rectangular in section, extending axially from a portion of the disk part 41a. As shown in FIG. 4, the brush-wiring terminals 42–44 and the capacitors 52 and 53 are mounted on the surface of the disk part 41a. The brush-wiring terminal 42 is used for a common ground (low potential power supply). The brush-wiring terminal 43 is used for a high potential power supply and a high speed. The brush-wiring terminal 44 is used for the high potential power supply and a low speed.

The capacitor 52 is connected between the brush-wiring terminal 42 to be used for the common ground and the brush-wiring terminal 43 to be used for the high potential power supply and the high speed. The capacitor 53 is connected between the brush-wiring terminal 42 to be used for the common ground and the brush-wiring terminal 44 to be used for the high potential power supply and the low-speed driving brush connection terminals 42a–44a are projected from the brush-wiring terminals 42–44, respectively. An end of each of the brush-wiring terminals 42–44 is bent and disposed on the surface of the insertion plate part 41b (FIG. 5).

As shown in FIG. 5, the external terminals 45–47, the choke coils 50 and 51, and the breaker 54 are mounted on the upper surface of the insertion plate part 41b. The breaker 54 is flat and square-shaped and disposed on the surface of the insertion plate part 41b, with a larger-area surface of the breaker 54 in contact with the insertion plate part 41b. The breaker 54 is surrounded with and disposed closely to the choke coils 50 and 51. More specifically, the breaker 54 and the choke coils 50 and 51 sandwiching the breaker 54 therebetween are disposed in approximately the center region of the surface of the insertion plate part 41b in the right-to-left direction of the circuit unit 23 in FIG. 5.

The external terminals 45–47 are arranged in parallel with each other, with one end of each of them projecting beyond the front end of the insertion plate part 41b. The brush-wiring terminal 42 to be used for the common ground is connected to the external terminal 45 through the breaker 54. The brush-wiring terminal 43 to be used for the high potential power supply and the high speed is connected to the external terminal 46 through the choke coil 50. The brush-wiring terminal 44 to be used for the high potential power supply and the low speed is connected to the external terminal 47 through the choke coil 51. The external terminal 45 has a first terminal, for a sensor, 45a extending to a side edge (lower side in FIG. 5) of the insertion plate part 41b.

The breaker 54 has an internal resistance value so set as to electrically disconnect the brush-wiring terminal 42 to be used for the common ground and the external terminal 45 from each other, based on heat generated mostly by the choke coils 50 and 51, and its self-generated heat. Further, the resistance value is determined in consideration of a rise of temperature in the surrounding of the breaker 54, which is caused when the heat of the armature 8 is transferred to the gear housing 20 and radiated in the unit accommodation part 20e.

As shown in FIG. 6, the external terminals 48 and 49 are mounted on the rear surface of the insertion plate part 41b. The external terminals 48 and 49 are arranged parallel with each other, with one end of each of them projecting beyond the front end of the insertion plate part 41b. The external terminals 48 and 49 are bent toward the side edge (upper side in FIG. 6) of the insertion plate part 41b and have second and third terminals 48a and 49a mounted on the other end thereof, respectively. The length between the front surface of the insertion plate part 41b on which the external terminals 45–47 are disposed and its rear surface on which the external terminals 48 and 49 are disposed is set in correspondence with the interval (space) between adjacent connector pins.

As shown in FIG. 1, the circuit unit 23 is fixedly accommodated in the unit accommodation part 20e by disposing the insertion plate part 41b in the unit accommodation part 20e and disposing the disk part 41a in the unit accommodation concave part 20a through the opening 20h. In this state, the front end of each of the external terminals 45–49 penetrates through the communication hole 20g and projects into the connector body 20f, thus constituting the connector pins which are connected to an external connector (not shown).

The unit accommodation concave part 20a accommodates the brush holder unit 24.

Figure 3:
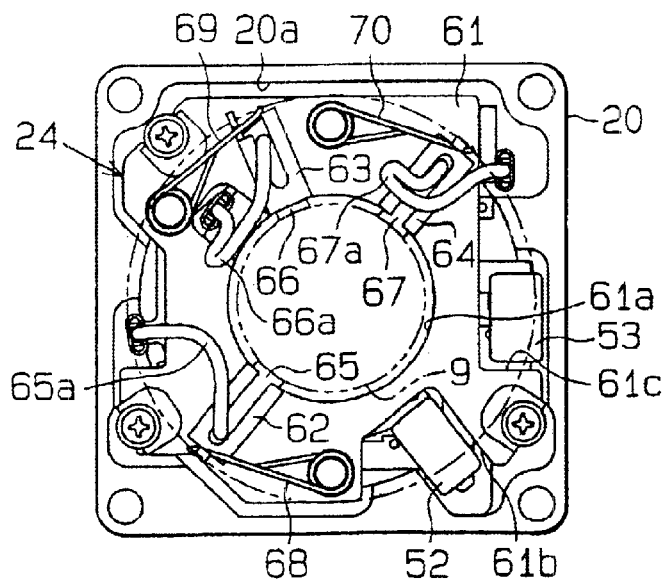
FIG. 3 is a plan view showing a brush holder unit used in the embodiment.

More specifically, as shown in FIG. 3, the brush holder unit 24 has a plate-shaped member 61, three brush holders 62–64, three brushes 65–67 (common brush 65, high-speed driving brush 66, low-speed driving brush 67), and three springs 68–70.

The plate-shaped member 61 is almost rectangular so that the unit accommodation concave part 20a can accommodate the plate-shaped member 61 therein. A center hole 61a is formed at the center of the plate-shaped member 61. Notches 61b and 61c are formed at positions near an edge of the plate-shaped member 61 such that the notches 61b and 61c do not interfere with the capacitors 52 and 53 respectively. The brush holders 62–64 are fixed to the upper surface of the plate-shaped member 61. The brush holders 62–64 are disposed along the diagonal lines of the approximately rectangular plate-shaped member 61. The brush holders 62–64 hold the brushes 65–67 respectively.

The brush holder 62 and the brush 65 are used for the common ground (low potential power supply). The brush holder 63 and the brush 66 are used for the high potential power supply and the high speed. The brush holder 64 and the brush 67 are used for the high potential power supply and the low speed. The springs 68–70 are disposed in the vicinity of the brush holders 62–64 of the plate-shaped member 61, respectively. The springs 68–70 urge the brushes 65–67 toward the commutator 9 (shown with a two-dot chain line in FIG. 3), respectively.

The brush holder unit 24 is accommodated in the unit accommodation concave part 20a, with the brush holder unit 24 overlapping the disk part 41a of the circuit unit 23. Pig tails 65a–67a of the respective brushes 65–67 are connected to the corresponding brush connection terminals 42a–44a respectively.

Although the disk part 41a and the brush holder unit 24 are provided separately, the disk plate 41a may be used as the brush holder unit by providing the brushes 65–67 and the brush holders 62–64.

A cover 21 is fixed to the open portion of the wheel accommodation part 20c of the gear housing 20. The cover 21 has a disk part 21a covering the open portion of the wheel accommodation part 20c and an extended portion 21b extending from the disk part and covering a surface of the unit accommodation part 20e, as shown in FIG. 2.

A supporting projected portion 21c extends from the center of the inner surface of the disk part 21a. A conductive switching pattern 71 is fixed to the periphery of the supporting projected portion 21c formed on the inner surface of the disk part 21a. Fixed to the inner surface of the extended portion 21b are three connection terminals (only one is shown in FIG. 2) 71a extended from the switching pattern 71 to a position corresponding to the first through third terminals, for a sensor, 45a, 48a, and 49a (FIG. 1) and bent. The connection terminal 71a is connected to the first through third terminals, for a sensor, 45a, 48a, and 49a with the cover 21 fixed to the gear housing 20. In FIG. 2, the circuit unit 23 including the first through third terminals, for a sensor, 45a, 48a, and 49a is not shown.

An annular contact plate 72 is fitted on the peripheral surface of the supporting projected portion 21c supporting the contact plate 72 rotatably. A plurality of contact plates 72a are formed on a surface of the contact plate 72 such that the contact plate 72a contacts the inner surface (switching pattern 71) of the disk part 21a under pressure. An engaging hole 72b is formed on the contact plate 72. The engaging pin 32 fixed to the carrier 29 is inserted into the engaging hole 72b such that the engaging pin 32 engages the engaging hole 72b in the rotating direction of the carrier 29. Accordingly, the contact plate 72 rotates according to the rotation of the carrier 29 (output shaft 31).

The switching pattern 71 and the contact plate 72 constitute a rotary sensor (cam switch) C which connects the external terminals 45, 48, and 49 (first through third terminals, for a sensor, 45a, 48a, and 49a) to the switching pattern 71 and disconnects them from each other when a plurality of the contact levers 72a is in and out of contact with the switching pattern 71, respectively during the rotation of the contact plate 72. The rotary sensor C detects a predetermined rotational angle of the carrier 29 (output shaft 31) or a rotational position thereof.

Figure 11:
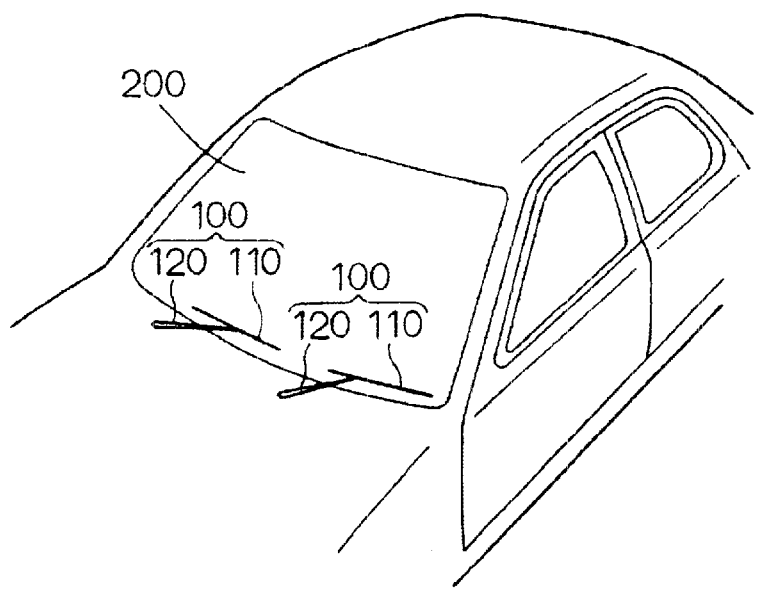
FIG. 11 is a schematic view showing a wiper system in which the embodiment is used.
Figure 12:
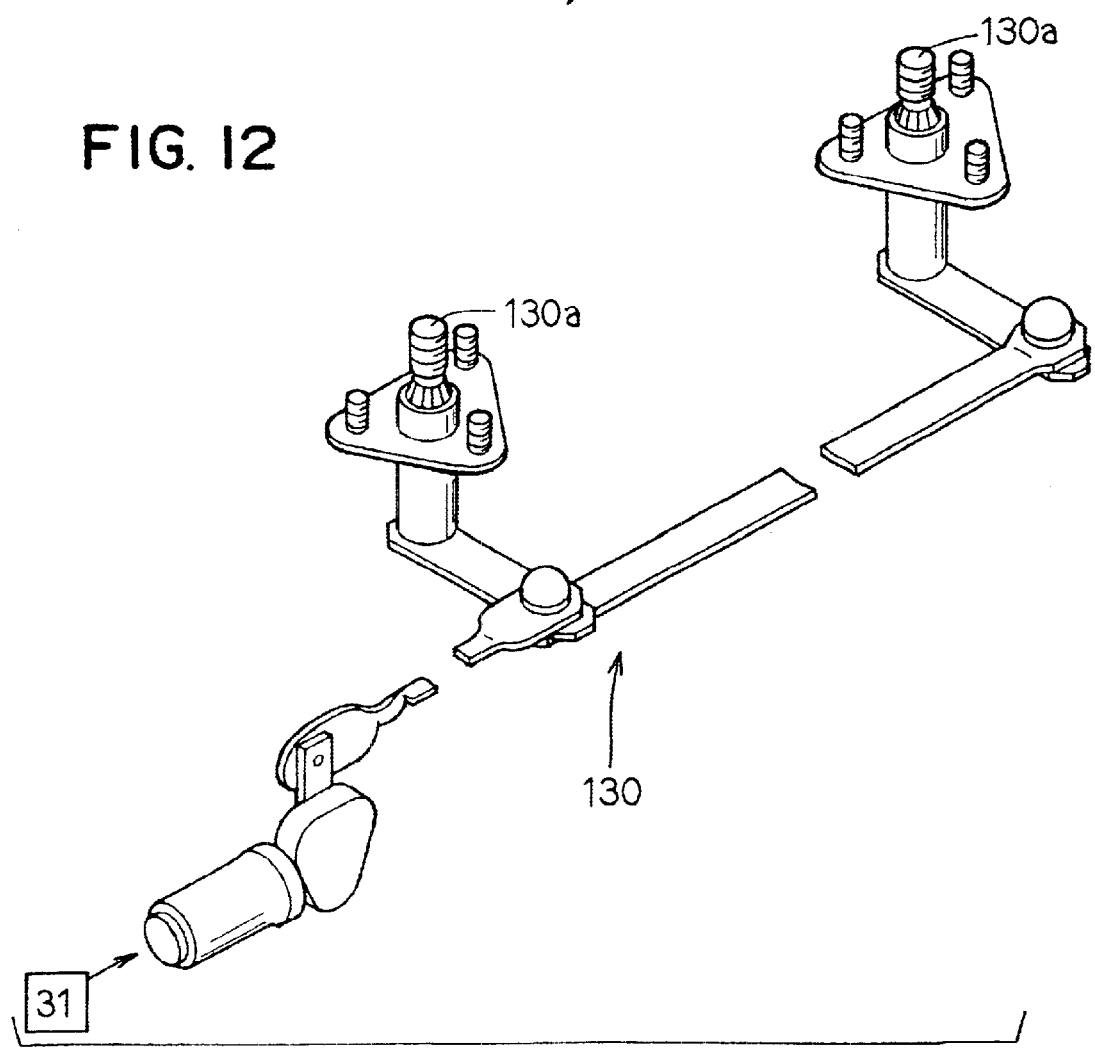
FIG. 12 is a perspective view showing a link mechanism used in the wiper system shown in FIG. 11.

The motor 1 is used as a wiper motor of a wiper device 100 shown in FIGS. 11 and 12. The wiper device 100 includes a pair of wiper blades 110 and arms 120, and a link mechanism 130. The link mechanism 130 is coupled to the output shaft 31 at one end and to the arms 120 through couplings 130a at the other end. When the output shaft 31 makes one rotation, the link mechanism 130 drives the wiper device 100 to reciprocate on a windshield 200 of a vehicle. When the wiper blade 110 is at a predetermined stop position (predetermined range of the front glass at its lowermost portion), the rotary sensor C connects the external terminals 45 and 48 to each other. When the wiper blade 110 is at a predetermined drive position (predetermined range of the front glass at its central portion), the rotary sensor C connects the external terminals 48 and 49 to each other.

An unshown connector of a control device 73 (FIG. 7) for the wiper is connected to the connector of the motor 1 for the wiper, namely, the front end of the connector body 20f and that of the external terminals 45–49.

Figure 7:
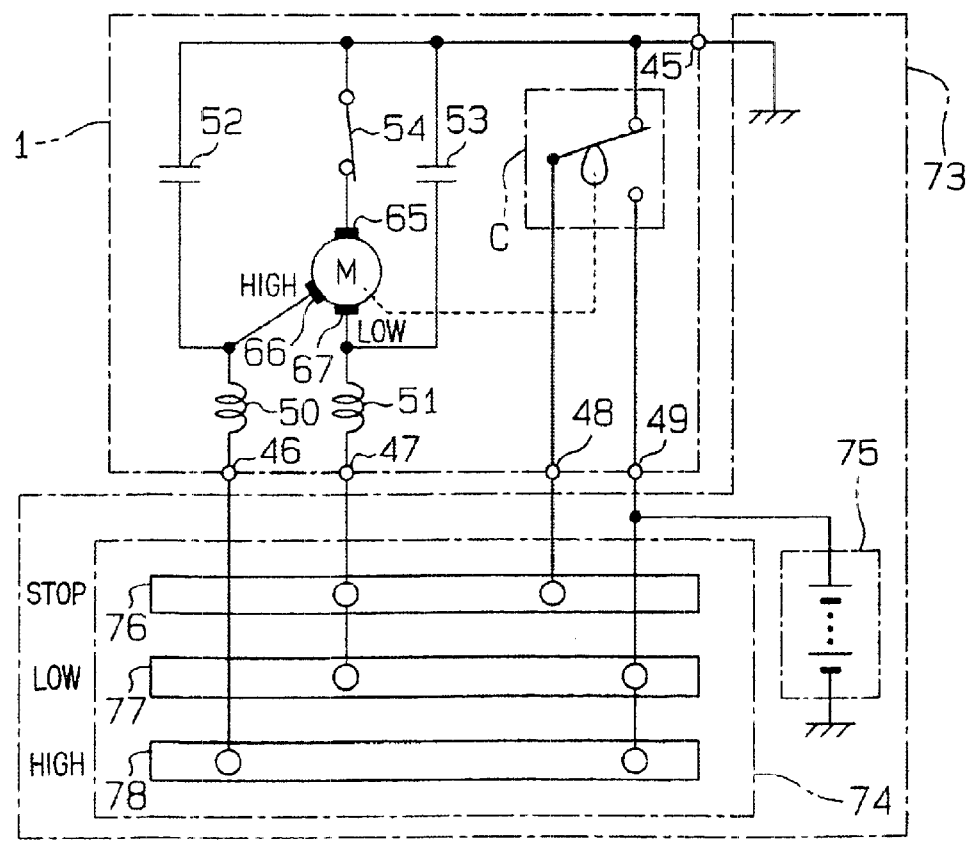
FIG. 7 is an electric circuit diagram showing a wiper system in which the embodiment is used.

The construction of the control device 73, for the wiper, connected to the motor 1 for the wiper is described below with reference to FIG. 7. FIG. 7 is a circuit diagram showing the motor 1 for the wiper and the control device 73 for the wiper.

The control device 73 has a wiper switch 74 and a battery 75. The external terminals 46–49 are connected to the wiper switch 74. The external terminal 49 is also connected to the high potential power supply (positive electrode) of the battery 75. The external terminal 45 is connected to the ground (negative electrode).

It is possible to selectively set the wiper switch 74 at any one of a stop position 76, a low-speed drive position 77, and a high-speed drive position 78. When the wiper switch 74 is set at the stop position 76, the external terminals 47 and 48 are connected to each other. When the wiper switch 74 is set at the low-speed drive position 77, the external terminal 47 and the high potential power supply (power supply at positive-electrode side) of the battery 75 are connected to each other. When the wiper switch 74 is set at the high-speed drive position 78, the external terminal 46 and the high potential power supply of the battery 75 are connected to each other.

In the motor 1, for the wiper, having the construction, when the wiper switch 74 is set at the low-speed drive position 77, a DC voltage is applied between the external terminals 47 and 48. As a result, electric current flows in the following order to thereby generate a magnetic field: power supply at positive-electrode side→wiper switch 74→external terminal 47→choke coil 51→low-speed driving brush 67→winding of armature 8→common brush 65→breaker 54→external terminal 45→ground (power supply at negative-electrode side) With the rotation of the rotor 6 at a low speed, the wiper blade rotates continuously in one direction at a low speed.

When the wiper switch 74 is set at the high-speed drive position 78, a DC voltage is applied between the external terminals 45 and 46. As a result, electric current flows in the order of power supply at positive-electrode side→wiper switch 74→external terminal 46→choke coil 50→high-speed driving brush 66→winding of armature 8→common brush 65→breaker 54→external terminal 45→ground (power supply at negative-electrode side). With the rotation of the rotor 6 at a high speed, the wiper blade rotates continuously in one direction at a high speed.

In these operations, the brushes 65–67 (65, 66) slide in contact with the commutator 9 to generate an electrical noise. The electrical noise is attenuated by the inductance of the choke coil 51 (50) and the capacitance of the capacitor 53 (52). Accordingly, propagation of the electrical noise to the external control device is reduced. Thus, it is possible to prevent the radiation of electromagnetic noise based on the electrical noise.

When the wiper switch 74 is set at the stop position 76, the external terminals 47 and 48 are connected to each other. At this time, it is supposed that the wiper blade is at the predetermined drive position (predetermined range of the front glass at its central portion). In this case, the rotary sensor (cam switch) C connects the external terminals 48 and 49 to each other. Thus, a DC voltage is applied between the external terminals 45 and 47. As a result, electric current flows in the order of power supply at positive-electrode side→external terminal 48→wiper switch 74→external terminal 49→choke coil 51→low-speed driving brush 67→winding of armature 8→common brush 65→breaker 54→external terminal 45→ground (power supply at negative-electrode side). With the rotation of the rotor 6 at a low speed in one direction, the wiper blade is driven at a low speed.

When the wiper blade moves or is located at the predetermined stop position (predetermined range of the front glass at its lowermost portion), the rotary sensor (cam switch) C connects the external terminals 45 and 48 to each other, and the external terminals 45 and 47 are connected to the ground. That is, there is formed a closed loop comprised of the external terminal 45 connected to the ground (power supply at negative-electrode side)→rotary sensor C→external terminal 48→wiper switch 74→external terminal 47→choke coil 51→low-speed driving brush 67→winding of armature 8→common brush 65→breaker 54→external terminal 45. An electric brake acts on the rotor 6. Consequently, the rotor 6 and the wiper blade are stopped.

When an excessively high load is applied to the output shaft 31 (wiper blade) during the rotation of the rotor 6 at the low speed, an excessively high current flows through the loop circuit and the winding of the armature 8 generates heat, which is considered equivalent to take-out of a part of the winding of the armature 8, and the choke 51 also generates heat. As a result, based on the heat generated by the choke coil 51 and its self-generated heat, the breaker 54 disconnects the brush 65 and the external terminal 45 from each other. Consequently, electric current does not flow through the looped circuit. Therefore, the heat generation is suppressed and thus burn-out is prevented.

When an excessively high load is applied to the output shaft 31 (wiper blade) during the rotation of the rotor 6 at the high speed, an excessively high current flows through the loop circuit. Consequently, the winding of the armature 8 and the choke 50 generate heat. As a result, based on the heat generated by the choke coil 50 and its self-generated heat of the breaker 54, the breaker 54 disconnects the brush 65 and the external terminal 45 from each other. Consequently, electric current does not flow through the looped circuit. Therefore, the heat generation is suppressed and thus burning is prevented.

The characteristic effect of the embodiment is described below.

(1) The breaker 54 is disposed in the vicinity of the choke coils 50 and 51 and so operates as to cut off the power supply circuit of the motor 1, based on the heat generated by the armature 8, the choke coils 50 and 51, and the breaker 54. Thus, burning is prevented. Further, it is unnecessary to dispose the breaker 54 in a very small space in the vicinity of the brushes 65–67 located in the neighborhood of the armature 8. Even though the breaker 54 is disposed in a space apart from the brushes 65–67, it is possible to prevent the burning of the motor 1 accurately. Thus, it is easy to accomplish designing and installation of the breaker 54. Further, it is unnecessary to set the internal resistance value of the breaker 54 larger than that of a breaker which is operated by only its self-generated heat. Therefore, the efficiency of the motor does not deteriorate greatly.

(2) The breaker 54 is disposed on the upper surface of the insertion plate part 41b, with the breaker 54 surrounded with the choke coils 50 and 51, and operates when any one of the choke coils 50 and 51 generates heat. Accordingly, the breaker 54 can suppress the heat generation of wires of the high-speed driving system connected to the choke coil 50 and the low-speed driving system connected to the choke coil 51. Consequently, it is possible to reduce the number of the breakers 54 and thus reduce the manufacturing cost. Further, it is possible to reduce the space for accommodating the breaker 54.

The embodiment may be modified as follows.

Figure 8:
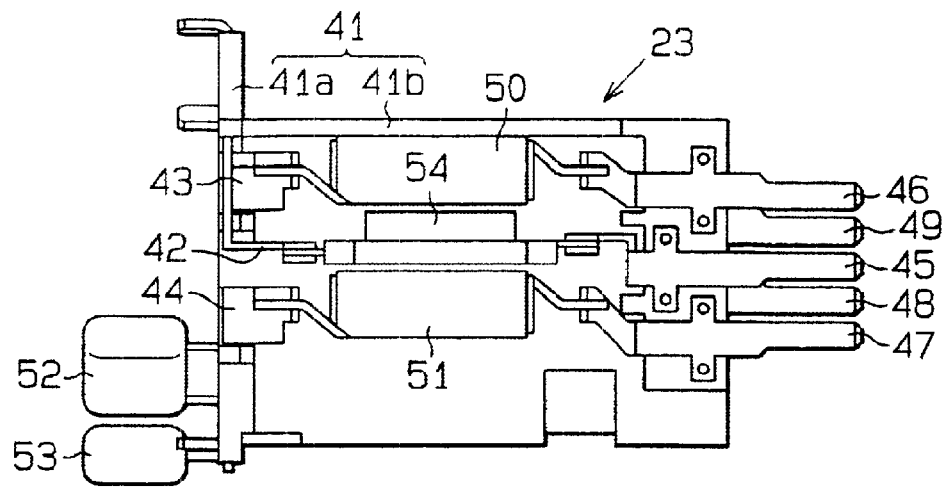
FIG. 8 is a plan view showing a circuit unit according to a modification of the embodiment.

In the above-described embodiment, the breaker 54 flat and square-shaped is disposed on the upper surface of the insertion plate part 41b, with the larger-area surface of the breaker 54 in contact therewith. But as shown in FIG. 8, it is possible to dispose the breaker 54 on the upper surface of the insertion plate part 41b, with the smaller-area surface of the breaker 54 in contact therewith and the larger-area surface thereof sandwiched between the choke coils 50 and 51. The modified construction can also provide an effect similar to that of the above-described embodiment. Because the modified construction can increase the area of the surface of the breaker 54 close to the choke coils 50 and 51, the breaker 54 efficiently detects the heat generated by the choke coils 50 and 51.

Figure 9:
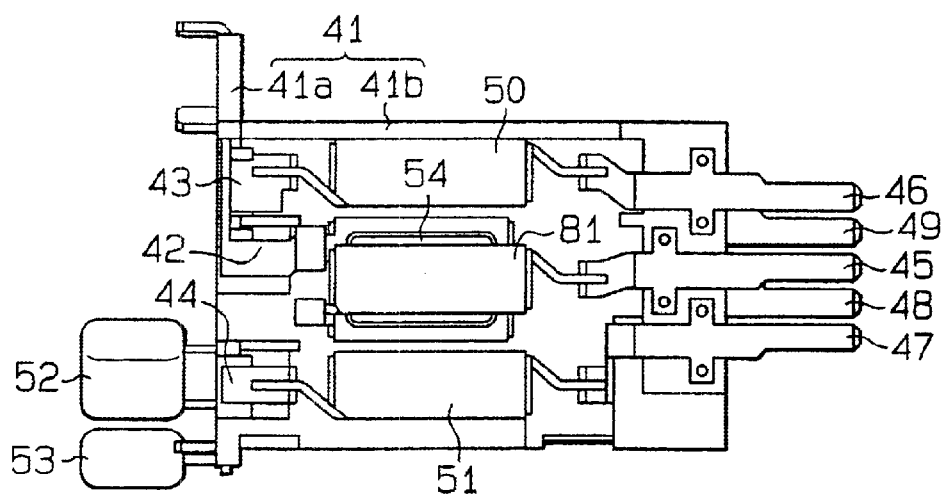
FIG. 9 is a plan view showing a circuit unit according to another modification of the embodiment.
Figure 10:
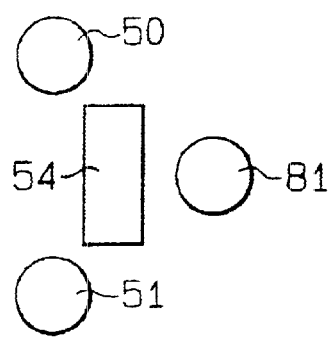
FIG. 10 is a perspective view showing an arrangement a breaker and a choke coil.

As described above, the present invention is embodied in the motor 1, for the wiper, having the choke coils 50 and 51. However, the present invention may be embodied in a motor having three or more choke coils. For example, as shown in FIG. 9, the motor 1 for the wiper may have a construction in which a choke coil 81 is connected between the breaker 54 and the external terminal 45 to provide the circuit unit with the three choke coils 50, 51, and 81. In this case, as shown in FIG. 10, the breaker 54 is enclosed with the choke coils 50, 51, and 81 by disposing the choke coils 50, 51, and 81 at the apexes of a triangle in the axial direction of the coil and disposing the breaker 54 at the center of the triangle. This construction can also provide an effect similar to that of the above-described embodiment.

Electrical noise generated by the brush 65 is attenuated by the choke coil 81. The breaker 54 operates in response to mostly the heat generated at least one of the choke coils 50, 51, and 81. Accordingly, the breaker 54 can suppress the heat generated by wires of different systems (for common ground, high-speed driving system, and low-speed driving system) connected to the choke coils 50, 51, and 81.

As described above, the present invention is embodied in the motor 1, for the wiper, having the choke coils 50 and 51. But the present invention may be embodied in a motor having only one choke coil. For example, in the motor which does not have the brush 66 for the high potential power supply and the high speed and is driven at a constant speed, it is possible to connect the choke coil to a brush for the high potential power supply, connect a breaker to a brush for the low potential power supply, and dispose the breaker in the vicinity of the choke coil. This construction eliminates the need for disposing the breaker in the vicinity of the brush located in the vicinity of the armature and allows the breaker to be located at a position apart from the brush.

In the above-described embodiment, the breaker 54 serving as the burn-out protector is disposed in the vicinity of the choke coils 50 and 51. However, it is possible to replace the breaker 54 with other burn-out protectors so long as they detect temperature and prevent burning. For example, the breaker 54 may be replaced with a thermistor. In this case, it is necessary to alter the circuit to prevent burning by using the thermistor which becomes very high in its electrical resistance value, based on heat generated by the choke coils 50 and 51, when an ambient thermistor becomes higher than a predetermined temperature and thereby almost cuts off electric current. This construction eliminates the need for disposing the thermistor in the vicinity of the brushes 65–67 located in the vicinity of the armature 8 and allows the thermistor to be located apart from the brushes 65–67.

In the above-described embodiment, the common brush 65 is connected to the ground (power supply at negative-electrode side), and the high-speed driving brush 66 and the low-speed driving brush 67 are connected to the high potential power supply (power supply at positive-electrode side). But instead, the common brush 65 may be connected to the high potential power supply (power supply at positive-electrode side), and the high-speed driving brush 66 and the low-speed driving brush 67 may be connected to the ground (power supply at negative-electrode side). That is, the rotational speed of the motor may be switched by selecting the brush connected to the ground (power supply at negative-electrode side).

As described above, the present invention is embodied in the motor 1 of the wiper device for a vehicle. However, the present invention may be embodied in a motor for use in other devices provided that the motor has the choke coil and the burn-out protector.

What is claimed is:

1. A motor comprising:
   a plurality of brushes held in a sliding contact with a commutator, wherein the brushes include a low-speed driving brush and a high-speed driving brush that are connected to one electrode of a power supply, and a common brush connected to another electrode of the power supply to be used in common when the high-speed driving brush and the low-speed driving brush are selectively used;
   coil devices connected in series with the high-speed driving brush and the low-speed driving brush, respectively for suppressing noise; and
   a burn-out protector for preventing motor burn-out caused by excessively high current, wherein the burn-out protector is connected in series with the common brush, and the burn-out protector is located adjacent to both of the coil devices such that the burn-out protector is responsive to heat generated by each of the coil devices and cuts off electric current supplied to the brushes based on heat generated by each of the coil devices.

2. The motor according to claim 1, wherein
   the burn-out protector is disposed in a manner directly facing both of the coil devices.

3. The motor according to claim 1, wherein:
   the burn-out protector includes either one of a circuit breaker and a thermistor.

4. The motor according to claim 1, wherein:

the brushes are mounted in a body made of an insulating resin together with the burn-out protector thereby to form a power supply circuit unit.

5. The motor according to claim 4, wherein:

the body of the power supply circuit unit has an insertion plate part in which the coil devices and the burn-out protector are mounted, and a disk part on which brush-wiring terminals are disposed to connect the coil devices and the burn-out protector to the brushes.

6. The motor according to claim 4, wherein:

the power supply circuit unit has brush-wiring terminals which connect the coil devices and the burn-out protector to the brushes, and external terminals which connect the coil device and the burn-out protector to an external connector.

7. A wiper motor for driving a vehicle wiper device having a wiper blade comprising:

high-speed and low-speed driving brushes selectively supplied with power for driving the wiper blade at high and low speeds, respectively;

a common brush used in common when the high-speed driving brush and the low-speed driving brush are selectively used;

coil devices each connected in series with the high-speed driving brush and the low-speed driving brush for suppressing noise, respectively; and a burn-out protector connected in series with the common brush, and the burn-out protector is located adjacent to both of the coil devices such that the burn-out protector is responsive to heat generated by at least one of the coil devices and cuts off electric current supplied to the brushes based on heat generated by at least one of the coil devices.

8. The wiper motor according to claim 7, wherein:

the burn-out protector is sandwiched between the coil devices.

9. The wiper motor according to claim 7, wherein:

the burn-out protector includes either one of a circuit breaker and a thermistor.

10. The wiper motor according to claim 7, wherein:

the brushes and the coil devices are mounted in a body made of an insulating material together with the burn-out protector to form a power supply circuit unit.

11. The wiper motor according to claim 10, wherein:

the body of the power supply circuit unit has an insertion plate part in which the coil devices and the burn-out protector are mounted, and a disk part on which brush-wiring terminals are disposed to connect the coil devices and the burn-out protector to the brushes.

12. The wiper motor according to claim 10, wherein:

the power supply circuit unit has brush-wiring terminals which connect the coil devices and the burn-out protector to the brushes, and external terminals which connect the coil devices and the burn-out protector to an external connector.

13. The wiper motor according to claim 10, further comprising:

a motor body; and a speed reduction unit including a speed reduction member, and a gear housing accommodating the speed reduction member and the power supply circuit unit, wherein the gear housing has a gear accommodation part accommodating the speed reduction member, and a power supply unit accommodation part partitioned from the gear accommodation part and accommodating the power supply circuit unit.

14. The wiper motor according to claim 13, wherein:

the body of the power supply circuit unit has an insertion plate part in which the coil devices and the burn-out protector are mounted, and a disk part on which brush-wiring terminals are disposed to connect the coil devices and the burn-out protector to the brushes; and the power supply unit accommodation part includes a brush accommodation part accommodating the disk part, and a circuit unit accommodation part communicating with the brush accommodation part and accommodating the insertion plate part.

15. The wiper motor according to claim 14, wherein:

the power supply circuit unit has external terminals which connect the coil devices and the burn-out protector to an external connector, the external terminal protruding from the circuit unit accommodation part to an outside of the gear housing; and the gear housing is formed with a connector body which surrounds a protruding part of the external terminal.

16. The wiper motor according to claim 7, wherein:

the low-speed driving brush and the high-speed driving brush are connected to a positive-electrode side of a power source; and the common brush is connected to a negative-electrode side of the power source.

17. A wiper motor for driving a vehicle wiper device having a wiper blade comprising:

a power source;

a motor body;

a speed reduction unit having a gear housing that includes a brush accommodating part and a unit accommodating part formed to extend away from the brush accommodating part;

a high speed driving brush disposed in the brush accommodating part for driving the wiper blade at a high speed when connected to one terminal of the power source;

a low speed driving brush disposed in the brush accommodating part for driving the wiper blade at a low speed when connected to the one terminal of the power source;

a common brush disposed in the brush accommodating part and connected to another terminal of the power source in series with the high speed brush and the low speed brush;

coil devices connected in series with the high speed driving brush and the low speed driving brush, respectively, for suppressing noise;

a burn-out protector connected in series with the common brush and disposed adjacently to both of the coil devices to be responsive to heat generated by the coil devices; and a power supply circuit unit disposed in the unit accommodating part and mounted on a circuit body made of insulating resin together with the coil devices and the burn-out protector, wherein the burn-out protector turns off power supplied to the motor through the common brush when the heat generated by and applied from the coil devices reaches a predetermined level.

* * * * *